Patented Jan. 6, 1953

2,624,699

UNITED STATES PATENT OFFICE 2,624,699

PURIFICATION OF CRUDE ACETONE

George G. Joris, Madison, N. J., assignor to Allied Chemical & Dye Corporation, New York, N. Y., a corporation of New York No Drawing. Application September 28, 1951, Serial No. 248,891

12 Claims. (Cl. 202—57)

This invention relates to the purification of crude acetone and is more particularly concerned with the purification of crude acetone containing aldehydic impurities, obtained especially from the decomposition of cumene hydroperoxide, to yield specification acetone.

A recently developed process yielding acetone and phenol as products involves decomposing cumene hydroperoxide having the formula

$$C_6H_4\text{—}C(CH_3)_2\text{—}OOH$$

in the presence of acidic substances to form substantially equimolecular amounts of phenol and acetone. The crude acetone obtained by distillation of the decomposition products of cumene hydroperoxide is impure and fails to pass the standard potassium permanganate test for specification grade acetone described in U. S. Pharmacopoeia, XII, page 10. Thus, when such crude acetone is tested with potassium permanganate according to standard procedure, duration of color only lasts 5 minutes when it should last at least 2 hours. The impurities in the crude acetone which are responsible for its failure to pass the permanganate test include principally aldehydic substances such as propionaldehyde, benzaldehyde and possibly acetaldehyde, present in amounts generally ranging from about .05 to 0.1%. Removal of these aldehydic impurities has heretofore proved troublesome. Also the crude acetone usually contains some weak acids thought to be chiefly acetic acid, which are present in amounts ordinarily between about .01 and 0.2%.

It is known to purify acetone by treatment with sodium hydroxide. However, I have found that while treatment of crude acetone containing aldehydic impurities, with sodium hydroxide either in the form of a concentrated aqueous solution or a solid, e. g. pellets, results in a degree of purification of the crude acetone, certain disadvantages discourage application of such treatment in commercial operation. Thus, when aqueous sodium hydroxide solutions are employed, undesirable emulsification generally takes place, and when solid caustic is used, the caustic soon becomes coated with tarry polymerized material, which rapidly renders the caustic inefficient.

One object of this invention is the purification of crude acetone. Another object is the purification of crude acetone containing aldehydric impurities to obtain specification acetone. A particular aim of the invention is the purification of crude acetone containing aldehydic impurities, and especially crude acetone obtained by the decomposition of cumene hydroperoxide, rapidly and inexpensively to recover specification grade acetone.

Other objects and advantages will be apparent from the following description of the invention.

The above objects and advantages are attained in accordance with the invention by treating crude acetone containing aldehydric impurities with a purifying agent in the form of a substance of the group consisting of activated carbon, graphite, diatomaceous earth, asbestos, pumice, coke, magnesia and sulfonated phenol-formaldehyde anion exchange resins, impregnated with an alkali metal hydroxide and separating the so-treated acetone from its impurities. The invention may be carried out by passing the crude acetone through a bed of the purifying agent or by mixing the purifying agent with the crude acetone at ordinary or elevated temperature, for example, by adding the purifying agent and subjecting the mixture to refluxing. By practice of this invention, specification acetone may be obtained rapidly and inexpensively without the difficulties heretofore encountered by the prior art.

Any crude acetone material containing aldehydic compounds as impurities is suitable for treatment by the invention process to obtain purified specification acetone. While the invention process is particularly valuable for the treatment of crude acetone obtained by the decomposition of cumene hydroperoxide, crude acetone obtained from other sources, e. g. by fermentation processes or by dehydrogenation of isopropanol, and containing aldehyde impurities, may be subjected to purification by the process described herein. However, for purposes of convenience, and since the crude acetone obtained from cumene hydroperoxide generally contains aldehydes as the main impurities, the invention will be described herein particularly in relation to the treatment of crude acetone from this source.

If the crude acetone to be treated contains small amounts of acidic impurities in addition to the aldehyde contaminants, usually the case where crude acetone from cumene hydroperoxide is employed, it is preferred to remove such acidic impurities prior to treatment of the crude acetone with the purifying agent of the invention. This is conveniently accomplished by first treating or contacting the crude acetone with an anion exchange resin, preferably a strongly basic sulfonated phenol-formaldehyde anion exchange resin.

While the medium with which the alkali metal hydroxide is impregnated may be any of those mentioned above, the preferred medium in the invention process is activated carbon, usually in the form of activated charcoal. The alkali metal hydroxides employed in preparing the purifying agent include, for example, sodium hydroxide and potassium hydroxide. Sodium hydroxide, however, has been found to produce the best results and its use is also advantageous from an economic standpoint. Hence, the preferred purifying agent of the invention is activated charcoal impregnated with sodium hydroxide.

When using sodium hydroxide, the amount of this alkali adsorbed on the medium employed, e. g. activated charcoal, is preferably 4–30% by weight of such medium. However, particularly when utilizing activated charcoal, my experience has shown that best results are realized according to the invention when such charcoal is impregnated with sodium hydroxide in an amount of 6–20% by weight of the charcoal. Amounts of sodium hydroxide substantially about 30% by weight of the medium employed should be avoided in order to obtain good results when applying the purifying agent in the invention process. It is to be recognized that when employing alkalies other than sodium hydroxide, e. g. potassium hydroxide, the amount of such alkali impregnant in the medium used may differ from that when employing sodium hydroxide. Thus, if KOH is the alkali metal hydroxide, about 50% more by weight of this material should be used than in the case of NaOH.

To prepare the purifying agent of the invention, for instance the NaOH-impregnated activated charcoal, such charcoal is first air-dried, e. g. at about 100° C., and a sodium hydroxide solution is passed through the activated charcoal to cause the desired amount of sodium hydroxide to be adsorbed on the charcoal. Sodium hydroxide solutions ranging from 5% in strength up to saturation may be used for this purpose. However, in order to impregnate the charcoal with the preferred 6–20% NaOH by weight, it has been found that this can best be accomplished using say 20 to 45% NaOH solutions. The amount of sodium hydroxide adsorbed appears to be proportional to the concentration of caustic solution used. For commercial operation, it is desirable to employ NaOH-impregnated charcoal purifying agents, in accordance with the invention, containing an amount of sodium hydroxide in the upper portion of the above 6–20% range; and hence the treatment of activated charcoal with about 40% NaOH solutions gives best results. Thus, using a 40% sodium hydroxide solution, as much as 16 parts or more of sodium hydroxide may be adsorbed per 100 parts of activated charcoal, while only about 6 to 8 parts may be adsorbed using a 20% sodium hydroxide solution. Following treatment with the sodium hydroxide solution, the water is removed from the alkali impregnated-activated charcoal, e. g. by washing with acetone.

In the preferred mode of operation of the invention process, the crude acetone is conducted or passed through a bed of activated charcoal impregnated with sodium hydroxide prepared in the manner described above and contained in a tube or column. Temperature of treatment of the crude acetone in this manner may vary from room temperature up to the boiling point of acetone, 56° C. However, treatment at about room temperature (20° C.) is preferred. When temperatures approaching 56° C. are employed, comparatively large amounts of solid reaction products are formed, causing the sodium hydroxide-impregnated charcoal purifying agent to become plugged and thus decreasing the efficiency of operation.

During treatment of the crude acetone with the alkali metal hydroxide-impregnated medium of the invention, the chief reaction which occurs is considered to be a condensation or polymerization of the aldehyde contaminants, such reaction being catalyzed by the alkali with which the medium, e. g. activated charcoal, is impregnated. The thin layer of caustic which is adsorbed on the large surface area of the activated charcoal or other medium in accordance with the invention, brings about polymerization of essentially only the aldehyde impurities, which are removed from the treating zone along with the effluent acetone without any material deposition of such polymerized impurities on the activated charcoal. While a small amount of acetone may also be condensed to diacetone alcohol, the latter is recovered as acetone by decomposition during subsequent distillation of the treated acetone.

Hence, the role of the alkali metal hydroxide in the purifying agent of the invention is catalytic, and the exhaustion of the purifying agent is due chiefly to neutralization of the caustic by any acid impurities present in the crude acetone. Accordingly, when the crude acetone is de-acidified, e. g. by contact with basic anion exchange resins, prior to treatment of the crude acetone with the purifying agent of the invention, exhaustion of such alkali metal hydroxide-impregnated medium purifying agent is greatly retarded. The efficient life of the purifying agent of the invention is thus essentially a function of the acid content of the crude acetone, particularly when the latter is not previously de-acidified. In any event, the efficiency of the purifying agent hereof in terms of the weight of crude acetone treated per unit of alkali metal hydroxide consumed, is extremely high. The activated charcoal or other medium of the invention with which the alkali is impregnated coacts with the alkali to render it much more effective as a purifying agent than when such alkali is employed alone as in the prior art. However, in so doing, it is clearly apparent that the activated charcoal or other invention medium does not function herein as a conventional adsorption agent for deposition thereon of the impurities present in the crude acetone, since such impurities, in polymerized form, remain in the crude acetone treated and are removed therewith from the purification zone.

In preferred procedure, the crude acetone to be treated is passed through a bed of the purifying agent of the invention at a rate such that substantially all the aldehyde impurities are polymerized, with very little, if any, of the acetone condensed to diacetone alcohol. The rate of flow of the crude acetone depends on the amount of alkali present in the activated charcoal or other medium, the amount of impurities in the crude acetone and to some extent the temperature of treatment. When the rate of flow is satisfactory and the bed of purifying agent is operating efficiently, the effluent acetone from the purification operation has a light yellow color indicating the presence of polymerized impurities, essentially aldehyde polymerization products. When the effluent acetone, on the other hand, is colorless, this indicates the presence of dissolved unpolymerized aldehyde contaminants resulting from unsatisfactory purification treatment.

In an alternative mode of procedure for carrying out the invention, the purification agent, say the preferred sodium hydroxide-impregnated activated charcoal, is added to the crude acetone and the mixture refluxed until the aldehyde impurities are polymerized and a sample of the acetone thus treated is light yellow in color. About 1% to 10% of the invention purifying agent by weight of the crude acetone is generally employed in this embodiment. The refluxing usually requires from ½ to 2 hours depending on the quantity of purifying agent used, the amount of alkali metal hydroxide present in the purifying agent and the amount of aldehyde impurities in the crude acetone. Here, as in the preferred procedure wherein the crude acetone is flowed through a bed of purifying agent, the duration of effectiveness of the alkali metal hydroxide-impregnated medium of the invention employed as purifying agent is principally a function of the acid content of the crude acetone, which acidity preferably should be decreased as previously indicated, prior to refluxing with my purifying agent. On completion of refluxing, the treated acetone containing polymerized aldehyde impurities is decanted from the mixture to separate the acetone from purifying agent. This refluxing mode of operation is essentially a batch procedure whereas the above-described preferred procedure of flowing the crude acetone through a bed of the purifying agent is essentially a continuous mode of operation and is obviously more advantageous and economical from a commercial standpoint.

Although the acetone treated in accordance with the invention principles contains polymerized, principally aldehyde, impurities, it is essentially free of alkali. Such acetone is distilled in a conventional manner, e. g. at atmospheric pressure, to separate it from these polymerized impurities. As noted above, any condensed acetone present in the form of diacetone alcohol is decomposed back into acetone during distillation. The still residue remaining contains the aldehyde impurities originally in the crude acetone, but now in the form of polymerization products of such aldehydes. The acetone distillate recovered is a purified colorless material which passes all tests, including the permanganate test, for specification grade acetone.

When the alkali metal hydroxide-impregnated medium employed as purifying agent in the invention becomes exhausted principally due to neutralization of the alkali metal hydroxide by the acids present in the crude acetone, the purifying agent may be regenerated for reuse. Such regeneration may be practiced by washing out the spent alkali, e. g. NaOH, with water, preferably at elevated temperature in order to more readily dissolve the spent alkali which is chiefly in the form of alkali metal salts such as sodium acetate. The medium, e. g. activated charcoal, is then dried by a flow of hot air, with or without a prior acetone wash. Alkali metal hydroxide, e. g. sodium hydroxide, solution is then passed through the activated charcoal to impregnate it with the desired amount of alkali. The strength of, for instance, sodium hydroxide solution employed for this purpose and the amount of sodium hydroxide adsorbed on the activated charcoal or other medium, are within the ranges previously noted above in making the purifying agent. When low strength alkali solutions, e. g. 20% NaOH, are employed for regeneration, the above-mentioned air-drying step improves the caustic adsorptivity of the activated charcoal or other medium. Thus, using 20% aqueous caustic solution, spent activated charcoal which is water- and acetone-washed, but not air-dried, appears to adsorb only about 50% of the sodium hydroxide which it adsorbs after air-drying. On the other hand, when employing stronger alkali solutions, e. g. 40% NaOH for regeneration, about the same amount of caustic is adsorbed with or without air-drying; and hence such drying under these circumstances is unnecessary.

I have found that the activated charcoal or other medium with which the alkali metal hydroxide is impregnated can be regenerated repeatedly with alkali substantially without loss of efficiency, and the caustic capacity of the charcoal is practically unchanged on successive regenerations.

The following examples illustrate practice of the invention, all quantities being expressed in parts by weight:

*Example 1.*—Activated charcoal of 8 mesh particle size was impregnated with about 7% of its weight of sodium hydroxide by passing a 20% sodium hydroxide solution through a bed of the activated charcoal previously air-dried at 100° C., followed by washing with acetone to remove water. Crude acetone obtained by decomposition of cumene hydroperoxide and containing aldehydic impurities, was flowed at room temperature through a column filled with such sodium hydroxide-impregnated charcoal, at a space velocity of 0.5 to 1 per hour. (Space velocity is the volume of liquid flowing through a zone per hour/volume of the zone.) In a typical run, the amount of acetone treated was 100 times the weight of the sodium hydroxide-impregnated activated charcoal purifying agent through which the crude acetone was passed. The light yellow effluent acetone obtained was distilled at atmospheric pressure to yield as distillate colorless specification grade acetone which readily passed the permanganate test. The residue obtained from the distillation amounted to about 0.5% by weight of the acetone product.

*Example 2.*—About a 50% sodium hydroxide solution was conducted through dried activated charcoal to impregnate the latter with about 20% NaOH by weight of the charcoal. Crude acetone containing principally aldehydes as impurities was then flowed through a bed of such sodium hydroxide-impregnated charcoal contained in a tower, at a space velocity of about ⅓ to ½ per hour. This bed of purifying agent treated more than 500 times its weight of crude acetone before the sodium hydroxide-impregnated activated charcoal became inefficient and required regeneration. The acetone so treated was light yellow in color and on distillation at atmospheric pressure produced specification acetone. The NaOH-activated charcoal purifying agent was regenerated by washing it with hot water and thereafter subjecting it again to treatment with sodium hydroxide solution.

*Example 3.*—To 200 parts of crude acetone obtained from cumene hydroperoxide and containing aldehydic impurities was added 20 parts of sodium hydroxide-impregnated activated charcoal purifying agent containing 20% sodium hydroxide by weight of the charcoal. This mixture was refluxed for a period of about one hour, after which time a sample of the acetone thus treated had a light yellow color. Refluxing was discontinued, the acetone decanted off from the mixture containing purifying agent and the acetone

*Example 4.*—A column was filled with activated charcoal and a 20% sodium hydroxide solution was passed through the column so that the charcoal adsorbed about 4% by weight of sodium hydroxide. Crude acetone containing essentially aldehydes as impurities was then passed down through the column, the run being discontinued after treatment of an amount of acetone 100 times the weight of the NaOH-impregnated charcoal purifying agent. The thus treated acetone was distilled to yield specification grade acetone. Analyses made at the top and bottom of the column after the run, showed that the NaOH-impregnated activated charcoal at the top of the column contained about 1.5% NaOH by weight of the charcoal, and the charcoal at the bottom contained about 2.4% NaOH. Thus, small amounts of sodium hydroxide were consumed during the treatment of the crude acetone mostly through chemical reaction, the sodium hydroxide consumption being about 250 mg. per kilogram of crude acetone treated.

*Example 5.*—A column was filled with magnesia pellets and a 40% potassium hydroxide solution was passed through the column so that the magnesia adsorbed about 15% by weight of potassium hydroxide. Crude acetone containing essentially aldehydes as impurities was then passed down through the column. The thus treated acetone was distilled to yield specification grade acetone.

Treatment of crude acetone containing chiefly aldehydic impurities for production of specification acetone in accordance with the invention principles employing as purifying agent an alkali metal hydroxide-impregnated medium, particularly activated charcoal, has the following advantages: (a) the process may be operated continuously simply by passage of the crude acetone through a bed of the purifying agent at room temperature; (b) the treated acetone is free from caustic; (c) the acetone distillation residue is kept to a minimum, such distillation being essentially a stripping operation of the treated acetone from its polymerized impurities; (d) the efficiency in terms of the weight of crude acetone treated per unit of sodium hydroxide consumed is extremely high; and (e) the regeneration of the purifying agent is simple and inexpensive.

Since various changes and modifications may be made in the invention without departing from the spirit thereof, the invention is to be taken as limited only by the scope of the appended claims.

I claim:

1. The process for the purification of crude acetone containing aldehydic impurities which comprises treating said crude acetone with a purifying agent in the form of a substance of the group consisting of activated carbon, graphite, diatomaceous earth, asbestos, pumice, coke, magnesia and sulfonated phenol-formaldehyde anion exchange resins, impregnated with an alkali metal hydroxide and separating the so-treated acetone from its impurities.

2. The process as defined in claim 1 wherein said alkali metal hydroxide is sodium hydroxide.

3. The process as defined in claim 1 wherein said substance is activated carbon.

4. The process for the purification of crude acetone containing aldehydic impurities which comprises treating said crude acetone with activated carbon impregnated with sodium hydroxide as purifying agent and separating the so-treated acetone from its impurities.

5. The process as defined in claim 4 wherein said purifying agent is regenerated and additional quantities of said crude acetone are treated therewith.

6. The process for the purification of crude acetone containing aldehydic impurities which comprises contacting said crude acetone with activated carbon impregnated with sodium hydroxide and distilling the so-treated acetone to separate it from its impurities.

7. The process for the purification of crude acetone containing aldehydic impurities which comprises refluxing said crude acetone in the presence of activated carbon impregnated with sodium hydroxide and distilling the so-treated acetone to separate it from its impurities.

8. The process for the purification of crude acetone containing aldehydic impurities, said crude acetone being obtained by the decomposition of cumene hydroperoxide, which comprises passing said crude acetone through a bed of activated charcoal impregnated with sodium hydroxide in an amount of 4-30% by weight of said activated charcoal and distilling the so-treated acetone to separate it from its impurities.

9. The process for the purification of crude acetone containing aldehydic impurities, said crude acetone being obtained by the decomposition of cumene hydroperoxide, which comprises refluxing said crude acetone in the presence of activated charcoal impregnated with sodium hydroxide in an amount of 4-30% by weight of said charcoal and distilling the so-treated acetone to separate it from its impurities.

10. The process for the purification of crude acetone containing aldehydic impurities, said crude acetone being obtained by the decomposition of cumene hydroperoxide, which comprises passing said crude acetone through a bed of activated charcoal impregnated with sodium hydroxide in an amount of 6-20% by weight of said activated charcoal to cause polymerization of said aldehydic impurities, distilling the effluent acetone to separate it from said polymerized impurities and recovering purified specification acetone.

11. The process for the purification of crude acetone containing aldehydic impurities, said crude acetone being obtained by the decomposition of cumene hydroperoxide, which comprises passing said crude acetone at about room temperature through a bed of activated charcoal impregnated with sodium hydroxide in an amount of 6-20% by weight of said activated charcoal to cause polymerization of said aldehydic impurities, said sodium hydroxide-impregnated charcoal being obtained by passing 20-45% sodium hydroxide solution through said activated charcoal, and distilling the effluent acetone to separate it from said polymerized impurities.

12. The process for the purification of crude acetone containing aldehydic impurities and of low acid content, said crude acetone being obtained by the decomposition of cumene hydroperoxide, which comprises passing said crude acetone through a bed of activated charcoal impregnated with sodium hydroxide in an amount of 6-20% by weight of said activated charcoal to cause polymerization of said aldehydic impurities, regenerating said sodium hydroxide-impregnated activated charcoal by washing out the spent sodium hydroxide with water at elevated temperature and passing 20-45% sodium hydroxide solution through said activated charcoal to impregnate it with 6-20% sodium hydroxide by weight of said activated charcoal, passing additional quantities of said crude acetone through said regenerted sodium hydroxide-impregnated activated charcoal to cause polymerization of said aldehydic impurities, distilling the effluent acetone obtained from these treatments to separate it from said polymerized impurities and recovering purified specification grade acetone.

GEORGE G. JORIS.

REFERENCES CITED

The following references are of record in the file of this patent:

Werner, Chemical Abstracts, vol. 29, page 7942.